US012368296B2

United States Patent
Zwijze et al.

(10) Patent No.: US 12,368,296 B2
(45) Date of Patent: Jul. 22, 2025

(54) IMPLEMENTING CONTACTOR OPENING AND FUSING STRATEGIES IN A POWER DISTRIBUTION UNIT

(71) Applicant: SENSATA TECHNOLOGIES, INC., Attleboro, MA (US)

(72) Inventors: Robert A. F. Zwijze, Vriezenveen (NL); Kevin Paterson, Wick (GB)

(73) Assignee: SENSATA TECHNOLOGIES, INC., Attleboro, MA (US)

( * ) Notice: Subject to any disclaimer, the term of this patent is extended or adjusted under 35 U.S.C. 154(b) by 0 days.

(21) Appl. No.: 18/737,099

(22) Filed: Jun. 7, 2024

(65) Prior Publication Data
US 2024/0413628 A1 Dec. 12, 2024

Related U.S. Application Data

(60) Provisional application No. 63/506,830, filed on Jun. 7, 2023.

(51) Int. Cl.
*H02H 7/20* (2006.01)
*H02H 1/00* (2006.01)

(52) U.S. Cl.
CPC ............ *H02H 7/20* (2013.01); *H02H 1/0007* (2013.01)

(58) Field of Classification Search
CPC . B60K 6/22; B60L 3/0023; B60L 3/04; B60L 50/64; B60L 58/21; B60L 58/25; B60Y 2200/91; B60Y 2200/92; H01H 39/00; H01H 50/021; H01H 85/0241; H01H 85/46; H01M 2220/20; H01M 50/204;
(Continued)

(56) References Cited

U.S. PATENT DOCUMENTS 11,052,784 B2 * 7/2021 Mensch ................. B60L 50/64
11,368,031 B2 * 6/2022 Qian ......................... H02J 7/24
(Continued)

FOREIGN PATENT DOCUMENTS

EP 3975362 A1 3/2022

OTHER PUBLICATIONS

International Search Report and Written Opinion, PCT/US2024/032997, Sep. 26, 2024, 16 pages.

*Primary Examiner* — Jared Fureman
*Assistant Examiner* — Nicolas Bellido
(74) *Attorney, Agent, or Firm* — Mark H. Williams

(57) ABSTRACT

Apparatuses and methods for implementing contactor opening and fusing strategies in a power distribution unit are disclosed, including a power distribution unit comprising: one or more contactors coupled to one or more charging systems; one or more active fuses in a circuit connecting the one or more contactors to a battery system; and a microcontroller configured to: receive one or more current values; determine whether the one or more current values meet a first set of predetermined current thresholds; in response to determining that the one or more current values meet the first set of predetermined current thresholds, trigger the one or more active fuses; determine whether the one or more current values meet a second set of predetermined current thresholds; and in response to determining that the one or more current values meet the second set of predetermined current thresholds, signal the one or more contactors to open.

20 Claims, 13 Drawing Sheets

(58) Field of Classification Search
CPC ............. H01M 50/249; H01M 50/505; H02H 1/0007; H02H 3/05; H02H 3/08; H02H 3/085; H02H 3/087; H02H 7/085; H02H 7/20; H02H 9/00; H02M 7/003; H02P 29/68; H05K 7/2089; Y02E 60/10; Y02T 10/64; Y02T 10/70; Y02T 90/16
See application file for complete search history.

(56) References Cited

U.S. PATENT DOCUMENTS

| | | |
|---|---|---|
| 11,660,976 B2 | 5/2023 | Fisher |
| 11,936,176 B2* | 3/2024 | Boury ................... H01H 47/002 |
| 2019/0296541 A1* | 9/2019 | Mensch ................... B60L 3/04 |
| 2020/0114784 A1* | 4/2020 | Fisher ................... B60L 3/0023 |
| 2020/0194996 A1* | 6/2020 | Fisher ................... H05K 7/2089 |
| 2020/0274375 A1* | 8/2020 | Griffiths ................... H02J 7/24 |
| 2022/0115878 A1 | 4/2022 | Khozikov et al. |
| 2022/0278520 A1 | 9/2022 | Boury et al. |
| 2023/0135012 A1 | 5/2023 | Wiegman |
| 2024/0047982 A1* | 2/2024 | Green ................... B60R 16/033 |

* cited by examiner

| 400 | Open CCS and MCS (no charging): | CCS charging: | MCS charging: |
|---|---|---|---|
| Firing pyro from shunt chip (fast, limited filtering) | +2000 A | +2000 A | +2000 A |
| Firing pyro from micro (slow, with filtering) | +100 A | +800 A | +1500 A |
| Open contactors | NA | +600 A | +1500 A |
| Nominal operating current | 0 A | +500 A | +1300 A |
| No current | 0 A | 0 A | 0 A |
| Open contactors | NA | -600 A | -1500 A |
| Firing pyro from micro (slow, with filtering) | -100 A | -800 A | -1500 A |
| Firing pyro from shunt chip (fast, limited filtering) | -2000 A | -2000 A | -2000 A |

FIG. 4

IMPLEMENTING CONTACTOR OPENING AND FUSING STRATEGIES IN A POWER DISTRIBUTION UNIT

BACKGROUND

High voltage direct current (DC) switching devices such as contactors and fuses are critical functional and safety elements in electric vehicles and energy storage applications. Their switching and current carry capabilities impose performance limits at the system level. Electrification and energy storage markets drive demand for higher performance and efficiency at the system level, which require DC contactors and fuses with higher switching and current carry capabilities than existing products.

A high-voltage power distribution unit (PDU) delivers power to all critical loads within an electric vehicle (EV) system while protecting electrical and electronic components and vehicle occupants with reliable circuit protection solutions. A contactor opening and fusing strategy is a core feature of a PDU to provide protection from overcurrent and short circuit events.

SUMMARY

Embodiments are directed to implementing contactor opening and fusing strategies in a power distribution unit. An embodiment is directed to a power distribution unit configured for a combined charging system (CCS) and megawatt charging system (MCS) interface with a battery system. The PDU provides protection for overcurrent and short circuit situations for no charging, CCS charging, and MCS charging using different fusing strategies and fuse triggers. By triggering pyrofuses indirectly from a microcontroller, with slow response at low current, and directly from a shunt current sensor amplifier, with fast response at high current, it can be assured that the current is shut off within a $I^2t$ limit to avoid damaging components or causing harm to vehicle occupants.

An embodiment is directed to a power distribution unit for implementing contactor opening and fusing strategies. The power distribution unit includes one or more contactors coupled to one or more charging systems. The power distribution unit also includes one or more active fuses in a circuit connecting the one or more contactors to a battery system. In addition, the power distribution unit also includes a microcontroller configured to receive from a current sensor, one or more current values corresponding to a current associated with the one or more contactors coupled to the one or more charging systems. The microcontroller is also configured to determine whether the one or more current values meet a first set of predetermined current thresholds and in response to determining that the one or more current values meet the first set of predetermined current thresholds, trigger the one or more active fuses. In addition, the microcontroller is also configured to determine whether the one or more current values meet a second set of predetermined current thresholds and in response to determining that the one or more current values meet the second set of predetermined current thresholds, signal the one or more contactors to open.

Another embodiment is directed to a method for implementing contactor opening and fusing strategies in a power distribution unit. The method includes a microcontroller of a power distribution unit receiving from a current sensor of the power distribution unit, one or more current values corresponding to a current associated with one or more contactors coupled to one or more charging systems. The microcontroller determines whether the one or more current values meet a first set of predetermined current thresholds and in response to determining that the one or more current values meet the first set of predetermined current thresholds, triggers one or more active fuses in a circuit connecting the one or more contactors to a battery system. The method also includes the microcontroller determining whether the one or more current values meet a second set of predetermined current thresholds and in response to determining that the one or more current values meet the second set of predetermined current thresholds, signaling the one or more contactors to open.

Another embodiment is directed to a non-transitory computer readable storage medium for implementing contactor opening and fusing strategies in a power distribution unit. The non-transitory computer readable storage medium stores instructions which, when executed, cause a microcontroller of a power distribution unit to receive from a current sensor of the power distribution unit, one or more current values corresponding to a current associated with one or more contactors coupled to one or more charging systems. The non-transitory computer readable storage medium also stores instructions which, when executed, cause the microcontroller of the power distribution unit to determine whether the one or more current values meet a first set of predetermined current thresholds and in response to determining that the one or more current values meet the first set of predetermined current thresholds, trigger one or more active fuses in a circuit connecting the one or more contactors to a battery system. In this embodiment, the non-transitory computer readable storage medium also stores instructions which, when executed, cause the microcontroller of the power distribution unit to determine whether the one or more current values meet a second set of predetermined current thresholds and in response to determining that the one or more current values meet the second set of predetermined current thresholds, signal the one or more contactors to open.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

FIG. 4 sets forth a table of an example fusing strategy for implementing contactor opening and fusing strategies in a power distribution unit in accordance with at least one embodiment of the present disclosure.

DETAILED DESCRIPTION

The terminology used herein for the purpose of describing particular examples is not intended to be limiting for further examples. Whenever a singular form such as "a", "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises", "comprising", "includes" and/or "including", when used, specify the presence of the stated features, integers, steps, operations, processes, acts, elements and/or components, but do not preclude the presence or addition of one or more other features, integers, steps, operations, processes, acts, elements, components and/or any group thereof.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e., only A, only B, as well as A and B. An alternative wording for the same combinations is "at least one of A and B". The same applies for combinations of more than two elements.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

Figure 1:
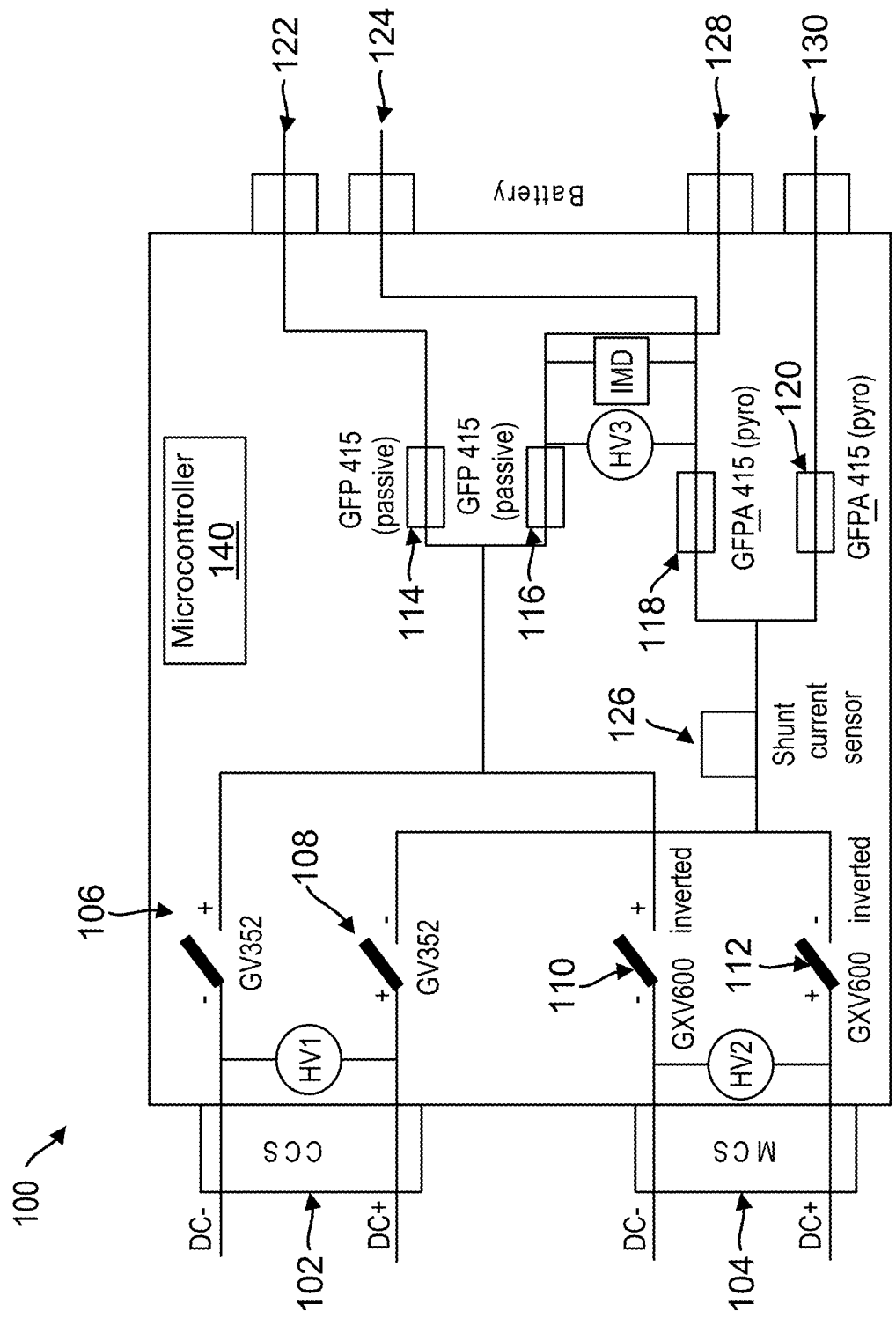
FIG. 1 sets a diagram of an example power distribution unit for implementing contactor opening and fusing strategies in accordance with at least one embodiment of the present disclosure.

For further explanation, FIG. 1 sets a diagram of an example power distribution unit 100 for implementing contactor opening and fusing strategies in a power distribution unit in accordance with at least one embodiment of the present disclosure. The example power distribution unit (PDU) 100 of FIG. 1 includes a continuous charging system (CCS) port 102 and a megawatt charging system (MCS) port 104, each having +DC and −DC inputs. The CCS port 102 is connected to positive and negative contactors 106, 108 and the MCS port 104 is connected to positive and negative contactors 110, 112. The positive voltage paths of the CCS and MCS contactors 106, 110 are connected to passive fuses 114, 116, which are in turn connected to positive voltage terminals 122, 128 of a battery system. The negative voltage paths of the CCS and MCS contactors 108, 112 are connected to a shunt current sensor 126, which is in turn connected to pyrofuses 118, 120. The pyrofuses 118, 120 are connected to negative voltage terminals 124, 130 of the battery system. A microcontroller 140 controls the opening and closing of the contactors 106, 108, 110, 112 as well as the fusing strategy for the pyrofuses 118, 120.

As will be explained further below, the current sensor 126 may be configured to measure one or more current values of a current associated with the one or more contactors. If the one or more current values exceed a set of predetermined current thresholds for the current sensor 126, the current sensor 126 may trigger the or more active fuses (pyrofuses). The current sensor 126 may also provide the one or more current values to the microcontroller 140. The microcontroller 140 may then determine if the one or more current values meet a current threshold for triggering the one or more active fuses (pyrofuses) 118, 120. If the one or more current values do not meet the microcontroller's current threshold for triggering the one or more active fuses, the microcontroller 140 may determine if the one or more current values meet another current threshold for opening the one or more contactors 106, 108, 110, 112. By triggering one or more active fuses (pyrofuses) indirectly from the microcontroller 140, with slow response at low current, and directly from the current sensor 126, with fast response at high current, it can be assured that the current is shut off within a particular limit (e.g., $I^2t$ limit) to avoid damaging components or causing harm to vehicle occupants.

Figure 2:
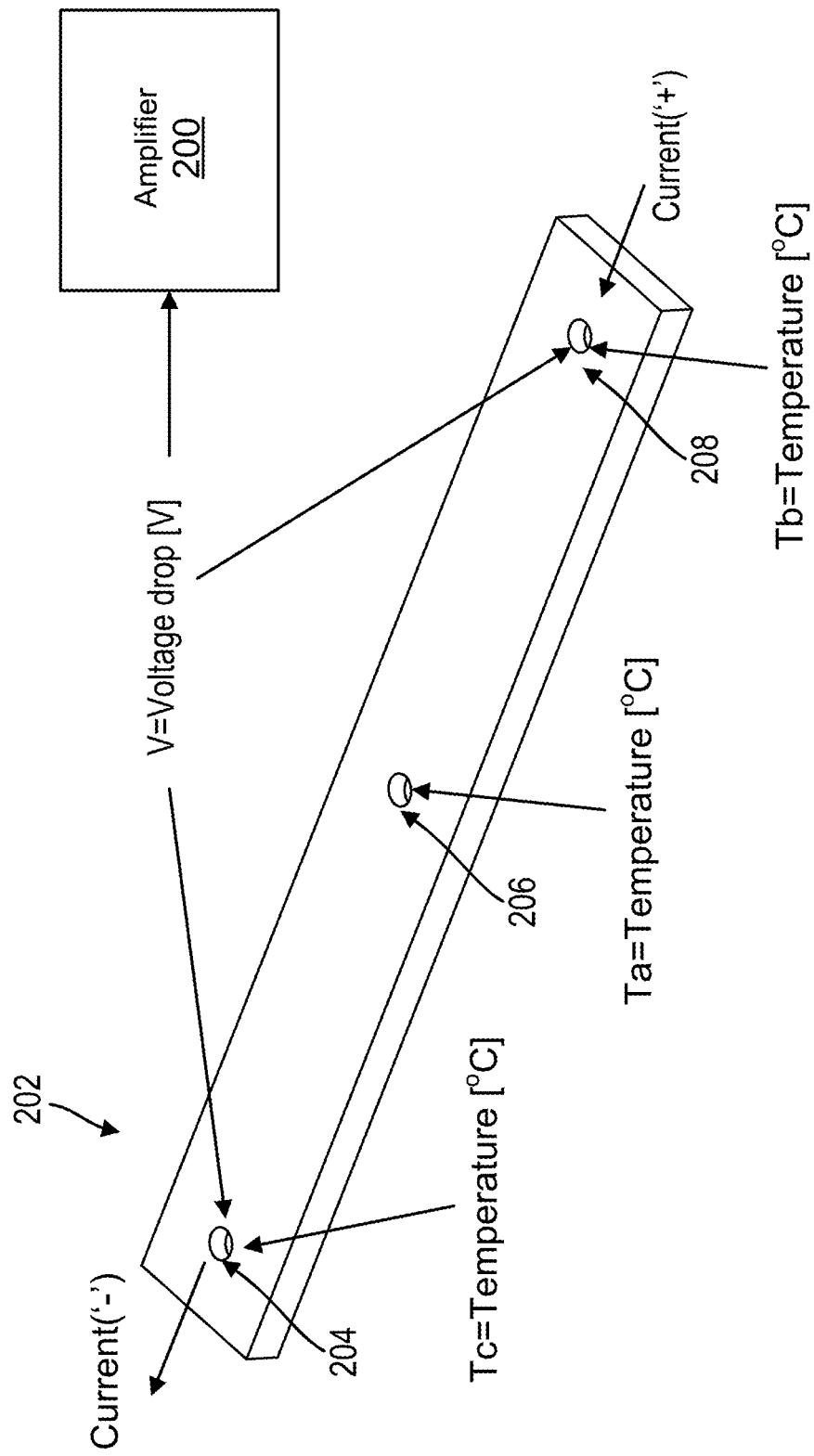
FIG. 2 illustrates functionality of a shunt current sensor for implementing contactor opening and fusing strategies in a power distribution unit in accordance with at least one embodiment of the present disclosure.
Figure 3:
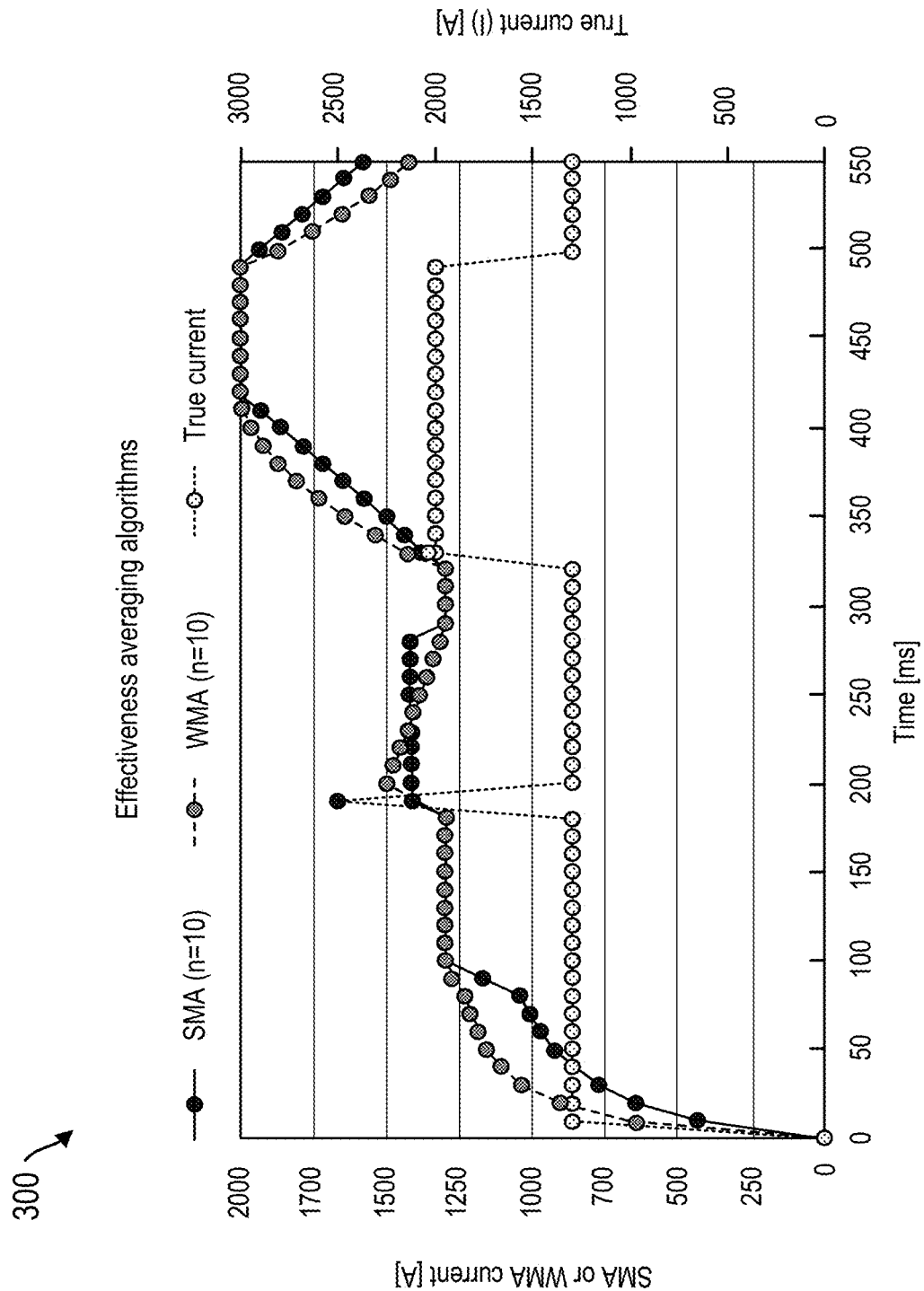
FIG. 3 sets forth a chart of averaging filters for implementing contactor opening and fusing strategies in a power distribution unit in accordance with at least one embodiment of the present disclosure.

For further explanation, FIG. 2 illustrates functionality of a shunt current sensor 126 for implementing contactor opening and fusing strategies in a power distribution unit in accordance with at least one embodiment of the present disclosure. The shunt current sensor 126 measures the voltage signal along a piece of busbar 202 that carries the current. This voltage is amplified by an amplifier 200, after which the amplified signal is sent to the microcontroller 140. In the microcontroller 140, the signal is compensated for temperature with negative temperature coefficient elements 204, 206, 208 that are mounted on the busbar 202. The signal from the NTC's facilitates compensation for the temperature dependence of the resistivity of the busbar. This temperature compensated signal is subsequently averaged with a filtering algorithm like a single moving average filter. For further explanation, FIG. 3 sets forth a graph 300 of an example application of filtering to determine average current for implementing contactor opening and fusing strategies in a power distribution unit in accordance with at least one embodiment of the present disclosure.

For further explanation, FIG. 4 sets forth an example fusing strategy 400 for implementing contactor opening and fusing strategies in a power distribution unit in accordance with at least one embodiment of the present disclosure. There are three charging cases: no charging, CCS charging, and MCS charging. In each of these cases a similar contactor opening and fusing strategy is applied. To aid illustration, an example fusing strategy for CCS charging is described below.

In one example, the nominal current for normal CCS charging is 500 ampere (A) and there is no need for triggering the active fuses. When the current is increased to a first limit (600 A in this example), contactors are requested to be opened by a signal from the microcontroller as at this current level the contactors are well capable of breaking this current without a need for triggering the fuses. As the current is still relatively small, there is enough time before an $I^2t$ limit of the fuses is exceeded. For example, this limit may be approximately 1 mega-ampere squared second ($MA^2s$). The $I^2t$ limit may correspond, for example, to the melting point of the fuses. In one example, at first current threshold (600 A in this example) the contactors should open within 2.78 seconds to avoid the $I^2t$ limit, which is much greater than a typical opening time of 20 milliseconds when carried out by direction of the microcontroller, and is therefore safe. When the current is further increased, there is a particular limit where the contactors will not be able to break the load anymore. Therefore, a second current threshold (800 A in this example) should be below this maximum break limit. This second current threshold of 800 A is assessed in the microcontroller with the relatively slow signal because of data transfer to the microcontroller and averaging in the microcontroller. At 800 A, the assessment in the microcontroller and triggering of the active pyrofuses should happen within 1.56 seconds in order to stay below 1 $MA^2s$, which is achievable by the microcontroller. When current increases further, faster triggering of the pyrofuses is required. For example, at 2000 A the microcontroller should trigger the pyro within 0.25 seconds in order to stay below 1 $MA^2s$. As the microcontroller is not that fast, triggering of the pyrofuse is taken over by an alarm pin of the shunt current sensor amplifier. In this amplifier, a threshold can be programmed (2000 A in this example) above which an alarm pin is activated that responds much faster (e.g., within 80 microseconds) after the threshold is exceeded. As the signal is not temperature compensated, care should be taken to set the current shunt sensor alarm threshold well above the first current threshold (600 A in this example) for contactor opening in order to avoid unwanted triggering of the pyrofuses. However, this threshold should not be too high such that the triggering of the fuses happens at such a high current that the 1 $MA^2s$ limit is exceeded. As there are three charge cases, setting the thresholds may be carried out by software or microcode in the microcontroller.

Figure 5:
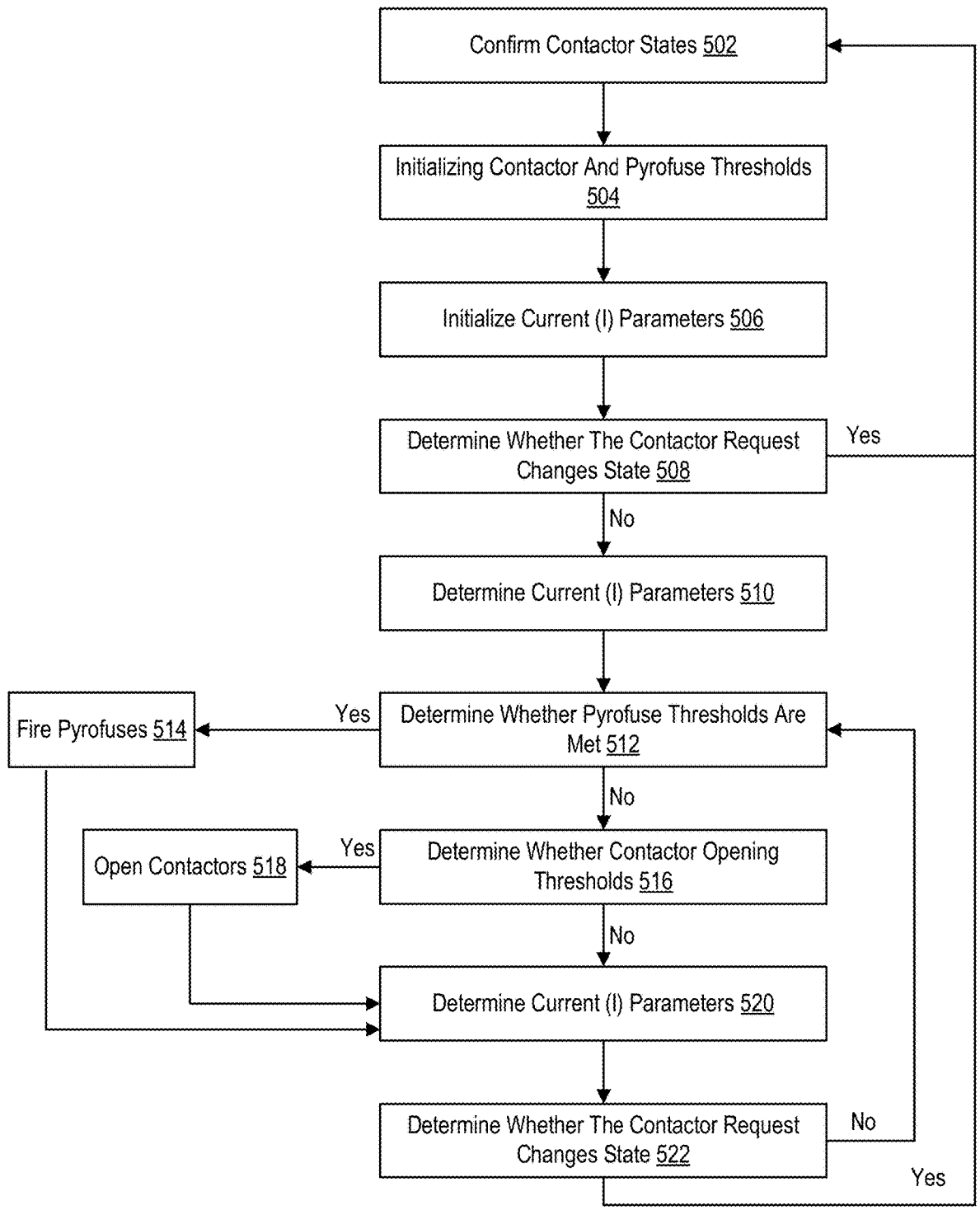
FIG. 5 sets forth a flow chart of an example method of implementing contactor opening and fusing strategies in a power distribution unit in accordance with at least one embodiment of the present disclosure.

For further explanation, FIG. 5 sets forth a flow chart of an example method of implementing contactor opening and fusing strategies in a power distribution unit. In some examples, the method of FIG. 5 is carried out by a microcontroller. The method of FIG. 5 includes confirming 502 the contactor states. If a signal not available (SNA) condition exists, then the most recent status without SNA is used.

The method of FIG. 5 also includes initializing 504 contactor and pyrofuse thresholds. For CCS and MCS contactors open, the contactor thresholds are set to a24=a8, a25=a9 and the pyrofuse thresholds are set to a26=a10, a27=a11. For CCS contactors closed, the contactor thresholds are set to a24=a12, a25=a13 and the pyrofuse thresholds are set to a26=a14, a27=a15. For MCS contactors closed, the contactor thresholds are set to a24=a16, a25=a17 and the pyrofuse thresholds are set to a26=a18, a27=a19.

The method of FIG. 5 also includes initializing 506 current (I) parameters. The average current is initialized to zero. For example, $I_{av}=0$, $I_1=0$, $I_{n+1}=0$, $I_{n+2}=0$.

The method of FIG. 5 also includes determining 508 whether the contactor request changes state.

The method of FIG. 5 also includes determining 510 current (I) parameters if the contactor request has not changed state. For example, for k from 2 to n, the first n samples are measured using the characteristic equation $I_k=a_0+V/(a_1+a_2T_a+a_3T_b+a_4T_c)+a_5T_a+a_6T_b+a7T_c$ (where $T_a$, $T_b$, and $T_c$ are NTC measurements on the busbar). If the contactor request state is still unchanged or if $I_k$=SNA, then average current $I_{av}$ is determined by $I_{av}=(I_{av}(k-1)+I_k)/k$. If $I_{av}<I_{n+1}$, then $I_{n+1}=I_{av}$. If $I_{av}<I_{n+2}$, then $I_{n+2}=I_{av}$.

The method of FIG. 5 also includes determining 512 whether pyrofuse thresholds are met. For example, pyrofuse thresholds are met if $I_{av} \leq a27$ or $I_{av} \geq a26$.

The method of FIG. 5 also includes firing 514 pyrofuses if pyrofuse thresholds are met. For example, the pyrofuses are fired and contactors are kept closed while pyrofuses are being fired, and after a time t1 the contactors are opened.

The method of FIG. 5 also includes determining 516 whether contactor opening thresholds are met. For example, contactors are opened if $I_{av} \leq a25$ or $I_{av}$ is $\geq a24$.

The method of FIG. 5 also includes opening 518 contactors if contactor opening thresholds are met.

The method of FIG. 5 also includes determining 520 current (I) parameters. For example, the instant current $I_n$ is determined using the characteristic equation $I_n=a_0+V/(a_1+a_2T_a+a_3T_b+a_4T_c)+a_5T_a+a_6T_b+a_7T_c$. If the contactor request state is still unchanged or if $I_n$=SNA, then average current $I_{av}$ is determined by $I_{av}=(I_n-I_1)/n$. If $I_{av}<I_{n+1}$, then $I_{n+1}$=Iav. If $I_{av}<I_{n+2}$, then $I_{n+2}=I_{av}$.

The method of FIG. 5 also includes determining 522 whether the contactor request changes state. If the contactor request has changed state, the method returns to confirming 502 contactor states. Otherwise, the method returns to determining 512 if pyrofuse thresholds have been met.

Figure 6:
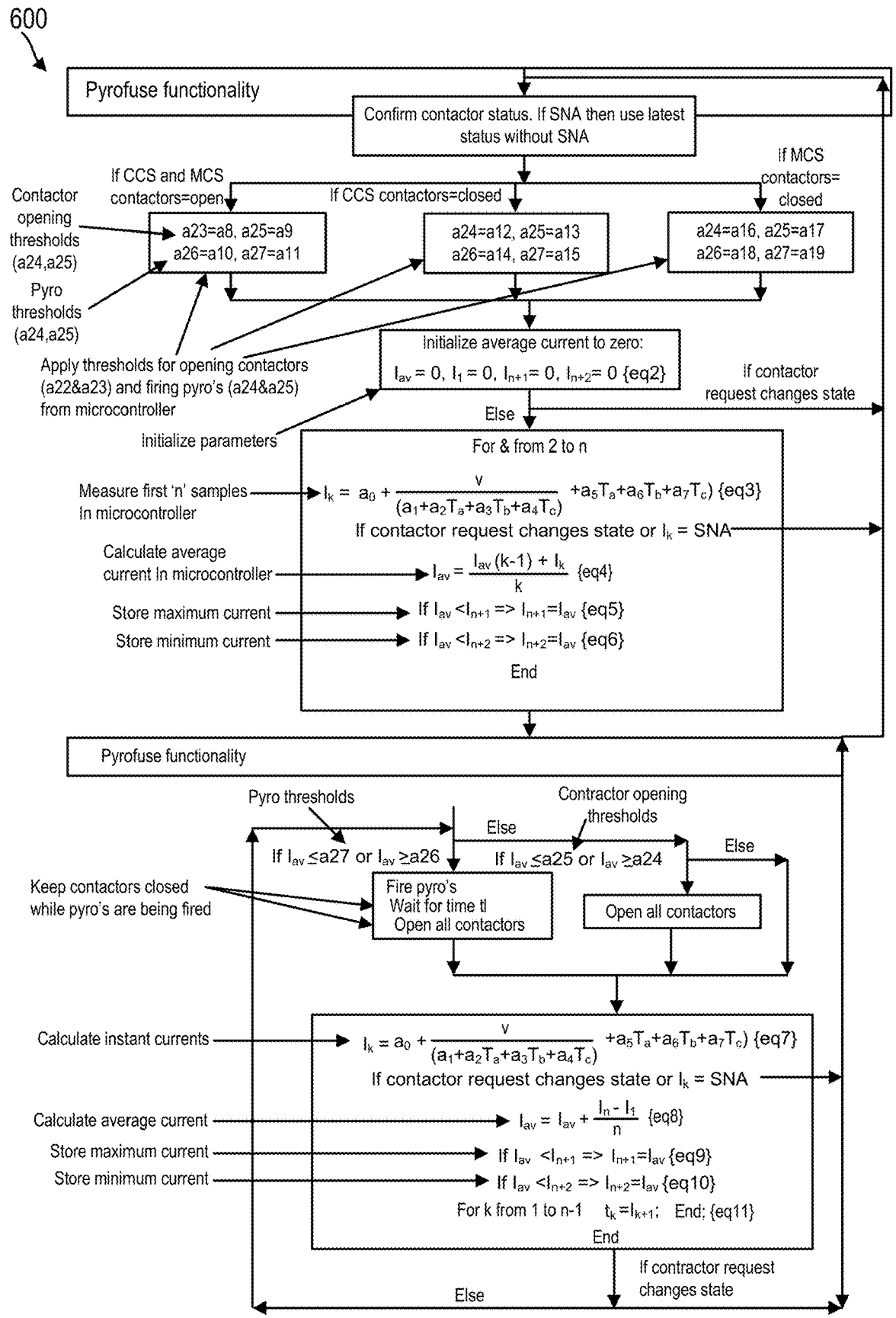
FIG. 6 sets forth a state diagram for implementing contactor opening and fusing strategies in a power distribution unit in accordance with at least one embodiment of the present disclosure.

For further explanation, FIG. 6 sets forth a state diagram 600 for a fusing strategy that can be implemented by the microcontroller as described with reference to FIG. 5.

Figure 7:
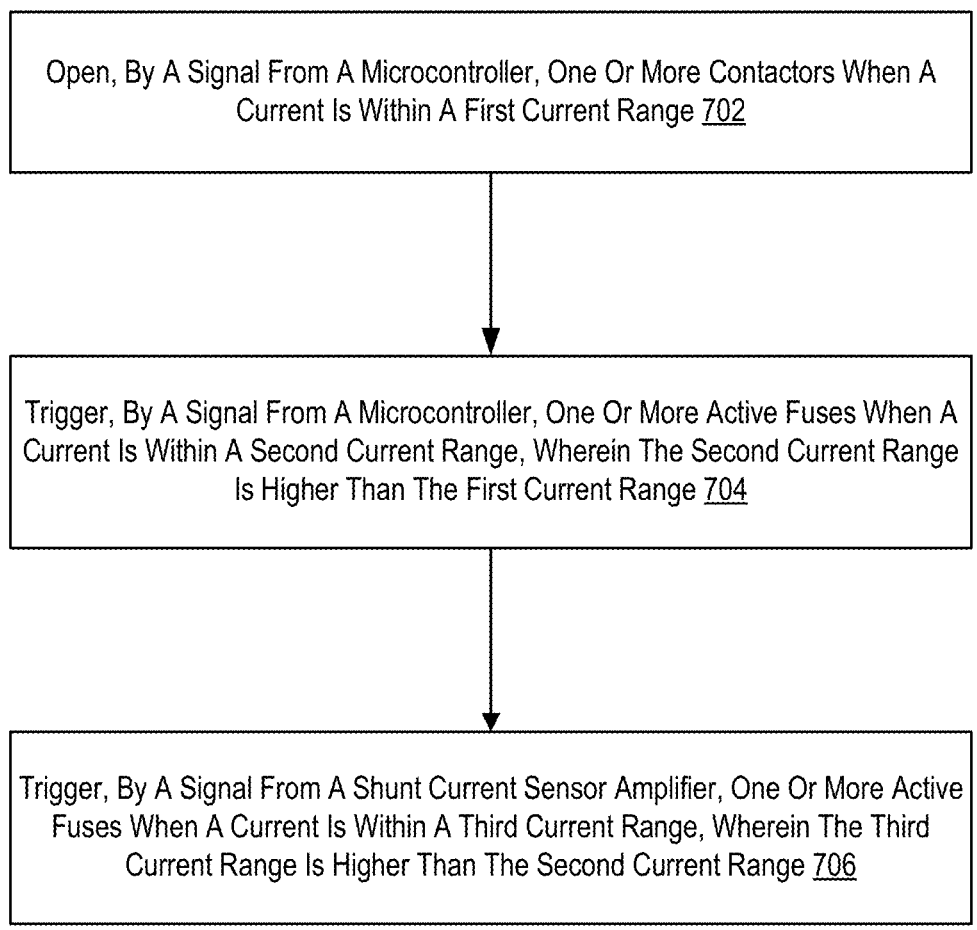
FIG. 7 sets forth a flow chart of an example method of implementing contactor opening and fusing strategies in a power distribution unit in accordance with at least one embodiment of the present disclosure.

For further explanation, FIG. 7 sets forth a flow chart of an example method of implementing contactor opening and fusing strategies in a power distribution unit. The method of FIG. 7 includes opening 702, by a signal from a microcontroller, one or more contactors when a current is within a first current range. Contactors must be opened within a certain amount of time after an overcurrent is detected to avoid damaging components or unsafe conditions. This is referred to as the $I^2S$ limit. Within the first current range (e.g. 600 A to 800 A), the load can be broken by the contactors without the need for fuses. The response time of the microcontroller is fast enough to signal to the contactors to open.

The method of FIG. 7 also includes triggering 704, by a signal from a microcontroller, one or more active fuses when a current is within a second current range, wherein the second current range is higher than the first current range. When the load exceeds a particular limit, the contactors are unable to break the load. Within the second current range (e.g., 800 A to 2000 A), the microcontroller is fast enough to trigger the active fuses to break the load before reaching the $I^2S$ limit.

The method of FIG. 7 also includes triggering 706, by a signal from a shunt current sensor amplifier, one or more active fuses when a current is within a third current range, wherein the third current range is higher than the second current range. When the current reaches the third current range (e.g., 2000+A), the microcontroller may not be fast enough to trigger the active fuses to break the load before reaching the $I^2S$ limit. Instead, an alarm signal from a shunt current sensor is used to trigger the active fuses.

The microcontroller is configured to implement respective fusing strategies for no charging, CCS charging, and MCS charging states by programming thresholds.

Figure 8:
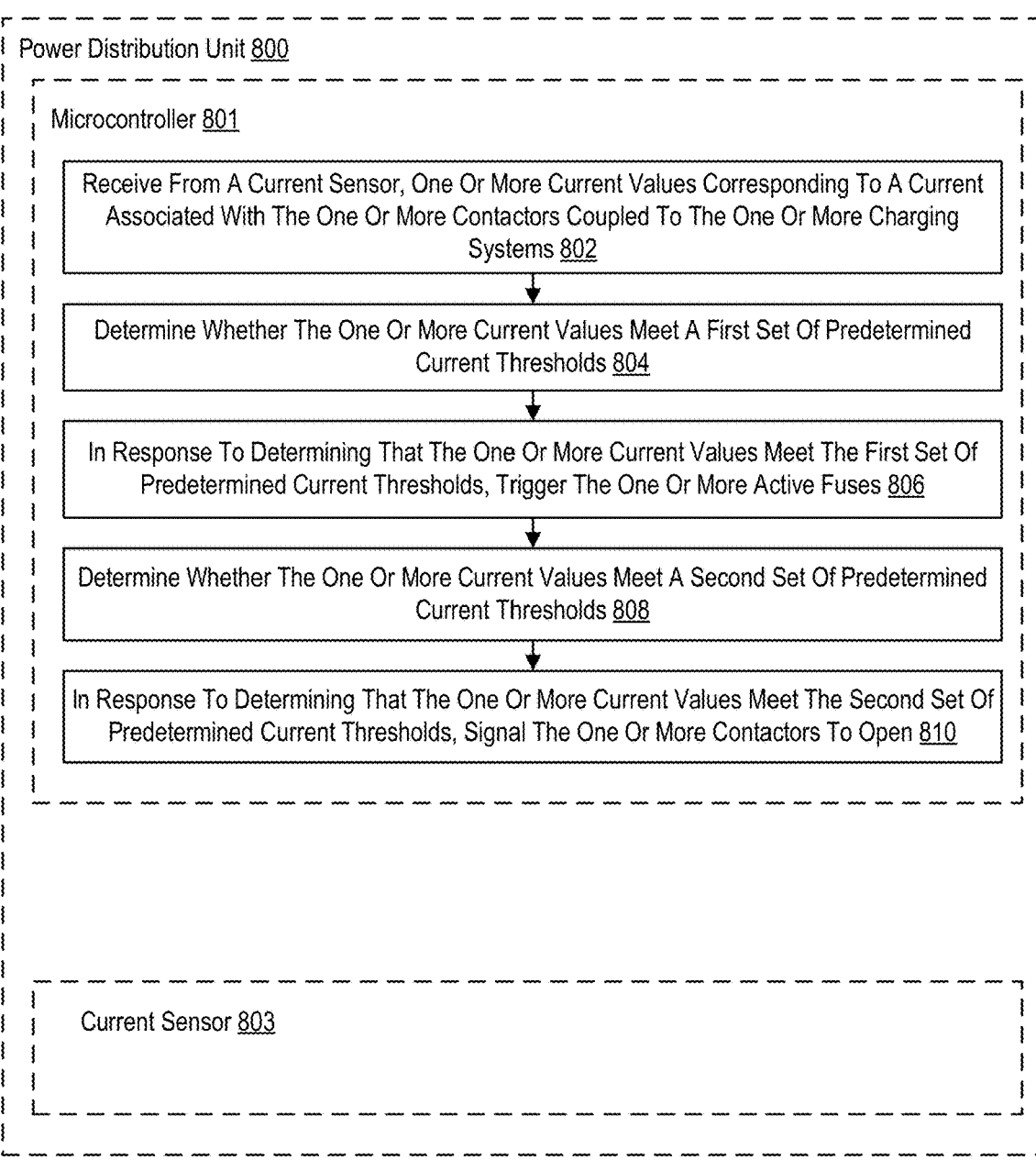
FIG. 8 sets forth a flow chart of an example method of implementing contactor opening and fusing strategies in a power distribution unit in accordance with at least one embodiment of the present disclosure.

For further explanation, FIG. 8 sets forth a flow chart of an example method of implementing contactor opening and fusing strategies in a power distribution unit. In the method of FIG. 8, a power distribution unit 800 includes a microcontroller 801 and a current sensor 803. The method of FIG. 8 includes the microcontroller 801 receiving 802 from the current sensor 803, one or more current values corresponding to a current associated with the one or more contactors coupled to the one or more charging systems. The current sensor may be configured to measure the voltage signal along a wire that couples the contactors and a battery system within the power distribution unit. The current sensor may amplify the measured voltage signal and transmit the amplified signal to the microcontroller. Receiving 802 from the current sensor 803, one or more current values corresponding to a current associated with the one or more contactors coupled to the one or more charging systems may be carried out by periodically receiving from the current sensor, a signal that indicates one or more current values that are based on measurements of the current within the power distribution unit.

The method of FIG. 8 also includes the microcontroller 801 determining 804 whether the one or more current values meet a first set of predetermined current thresholds. A set of predetermined current thresholds may be one or more current thresholds that determine current limits for a particular type of disconnection of the current, given the state of the one or more contactors. In the method of FIG. 8, the first set of predetermined current thresholds correspond to the current thresholds for the microcontroller to trigger the one or more active fuses. For example, the first set of predetermined current threshold may include a first threshold of above 800 A and a second threshold of below −800 A. In this example, if the microcontroller receives one or more current values that are below −800 A or above 800 A, the microcontroller may determine that the one or more current values meet the first set of predetermined current thresholds.

In addition, the method of FIG. 8 also includes in response to determining that the one or more current values meet the first set of predetermined current thresholds, triggering 806, by the microcontroller 801, one or more active fuses in a circuit connecting the one or more contactors to a battery system. Triggering 806, by the microcontroller 801, one or more active fuses in a circuit connecting the one or more contactors to a battery system may be carried out by sending a signal from the microcontroller to the one or more active fuses. In response to receiving the signal from the microcontroller, the one or more active fuses may activate and sever the connection between the one or more contactors and the battery system.

The method of FIG. 8 also includes the microcontroller 801 determining 808 whether the one or more current values meet a second set of predetermined current thresholds. Determining 808 whether the one or more current values meet a second set of predetermined current thresholds may be carried out by comparing the one or more current values to the second set of predetermined current values. As explained above, a set of predetermined current thresholds may be one or more current thresholds that determine current limits for a particular type of disconnection of the current, given the state of the one or more contactors. In the method of FIG. 8, the second set of predetermined current thresholds correspond to the current thresholds for the microcontroller to open the one or more contactors. For example, the second set of predetermined current threshold may include a first threshold of above 600 A and a second threshold of below −600 A. In this example, if the microcontroller receives one or more current values that are below −600 A or above 600 A, the microcontroller may determine that the one or more current values meet the second set of predetermined current thresholds.

In the addition, the method of FIG. 8 also includes in response to determining that the one or more current values meet the second set of predetermined current thresholds, signaling 810, by the microcontroller 801, the one or more contactors to open. Signaling 810, by the microcontroller 801, the one or more contactors to open in response to determining that the one or more current values meet the second set of predetermined current thresholds may be carried out by sending a signal from the microcontroller to the one or more contactors. In response to receiving the signal from the microcontroller, the one or more contactors may open and sever the connection between the charging system and the battery system.

Figure 9:
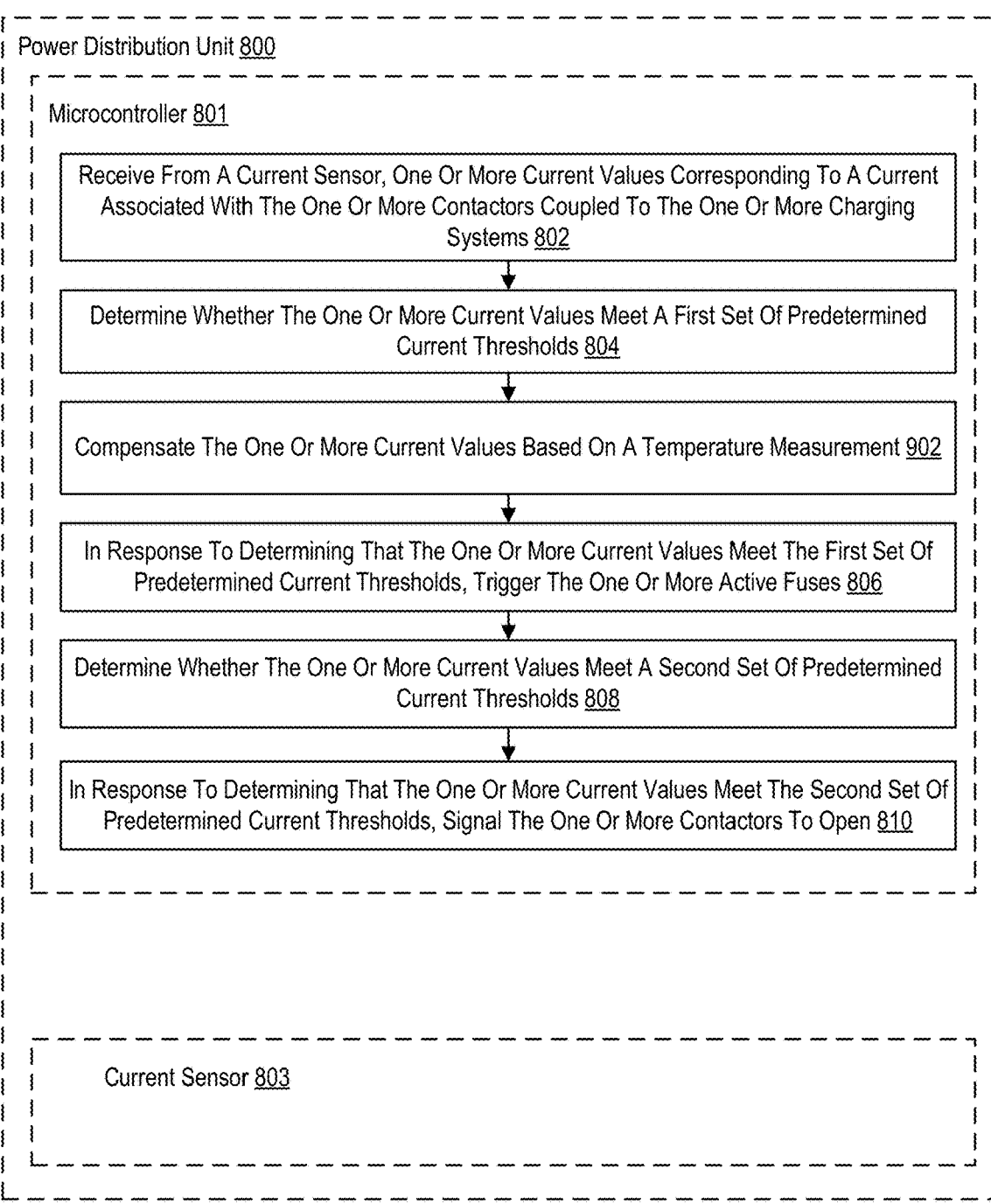
FIG. 9 sets forth a flow chart of an example method of implementing contactor opening and fusing strategies in a power distribution unit in accordance with at least one embodiment of the present disclosure.

For further explanation, FIG. 9 sets forth a flow chart of an example method of implementing contactor opening and fusing strategies in a power distribution unit. The method of FIG. 9 extends the method of FIG. 8 in that the method of FIG. 9 further includes compensating 902, by the microcontroller 801, the one or more current values based on a temperature measurement. Compensating 902, by the microcontroller 801, the one or more current values based on a temperature measurement may be carried out by applying negative temperature coefficients that are mounted on a busbar utilized by the current sensor to monitor the current. In this example, the signal from the NTC facilitates compensation for the temperature dependence of the resistivity of the busbar.

Figure 10:
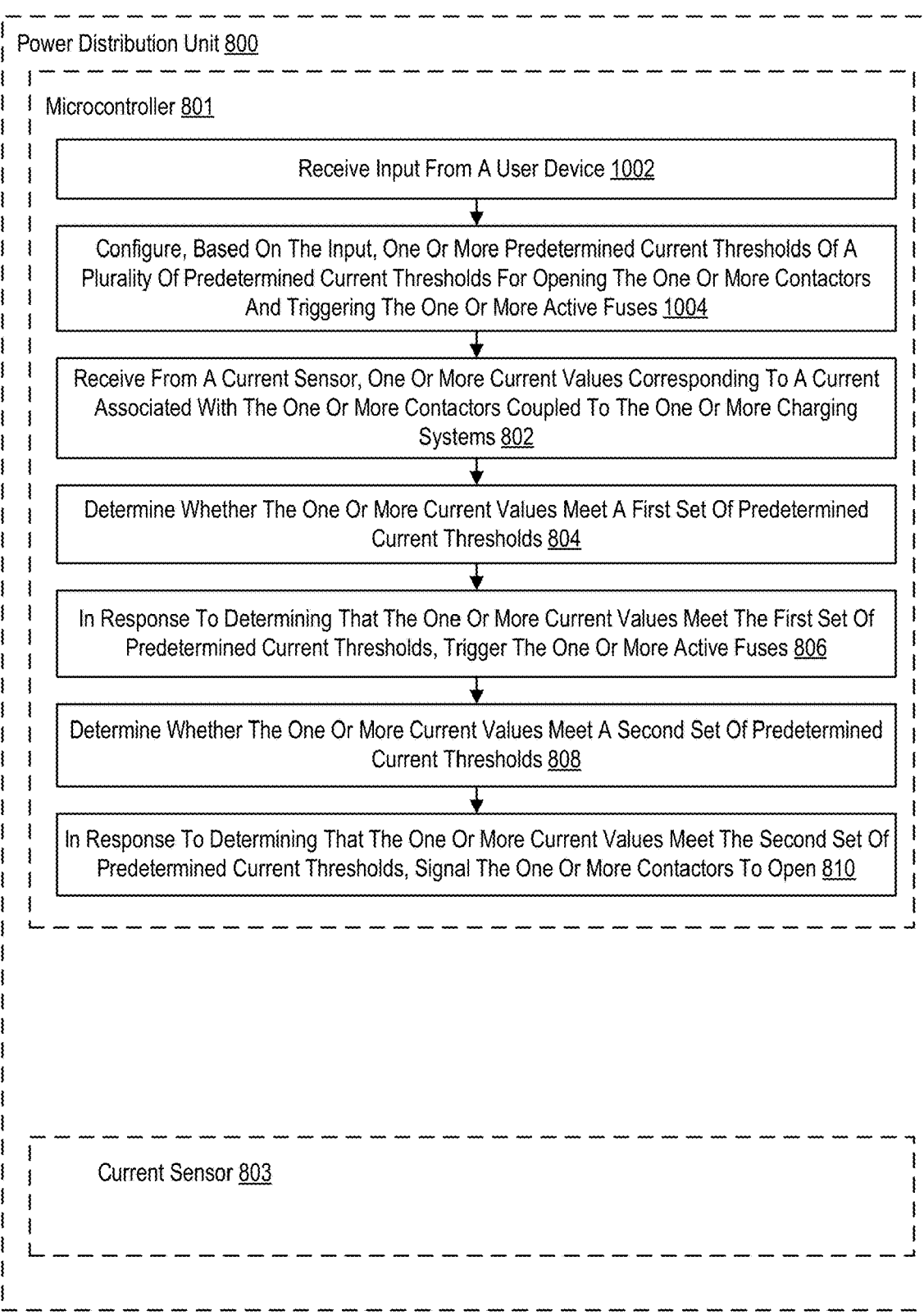
FIG. 10 sets forth a flow chart of an example method of implementing contactor opening and fusing strategies in a power distribution unit in accordance with at least one embodiment of the present disclosure.

For further explanation, FIG. 10 sets forth a flow chart of an example method of implementing contactor opening and fusing strategies in a power distribution unit. The method of FIG. 10 extends the method of FIG. 8 in that the method of FIG. 10 further includes receiving 1002, by the microcontroller 801, input from a user device. A user device may be any device that provides a user an interface to input values for thresholds and transmit those new values as input to the microcontroller. Receiving 1002, by the microcontroller 801, input from a user device may be carried out by receiving data from the user.

The method of FIG. 10 also includes the microcontroller 801 configuring 1004, based on the input, one or more predetermined current thresholds of a plurality of predetermined current thresholds for opening the one or more contactors and triggering the one or more active fuses. Configuring 1004, based on the input, one or more predetermined current thresholds of a plurality of predetermined current thresholds for opening the one or more contactors and triggering the one or more active fuses may be carried out by storing a new value for a current threshold associated with a contactor state.

Figure 11:
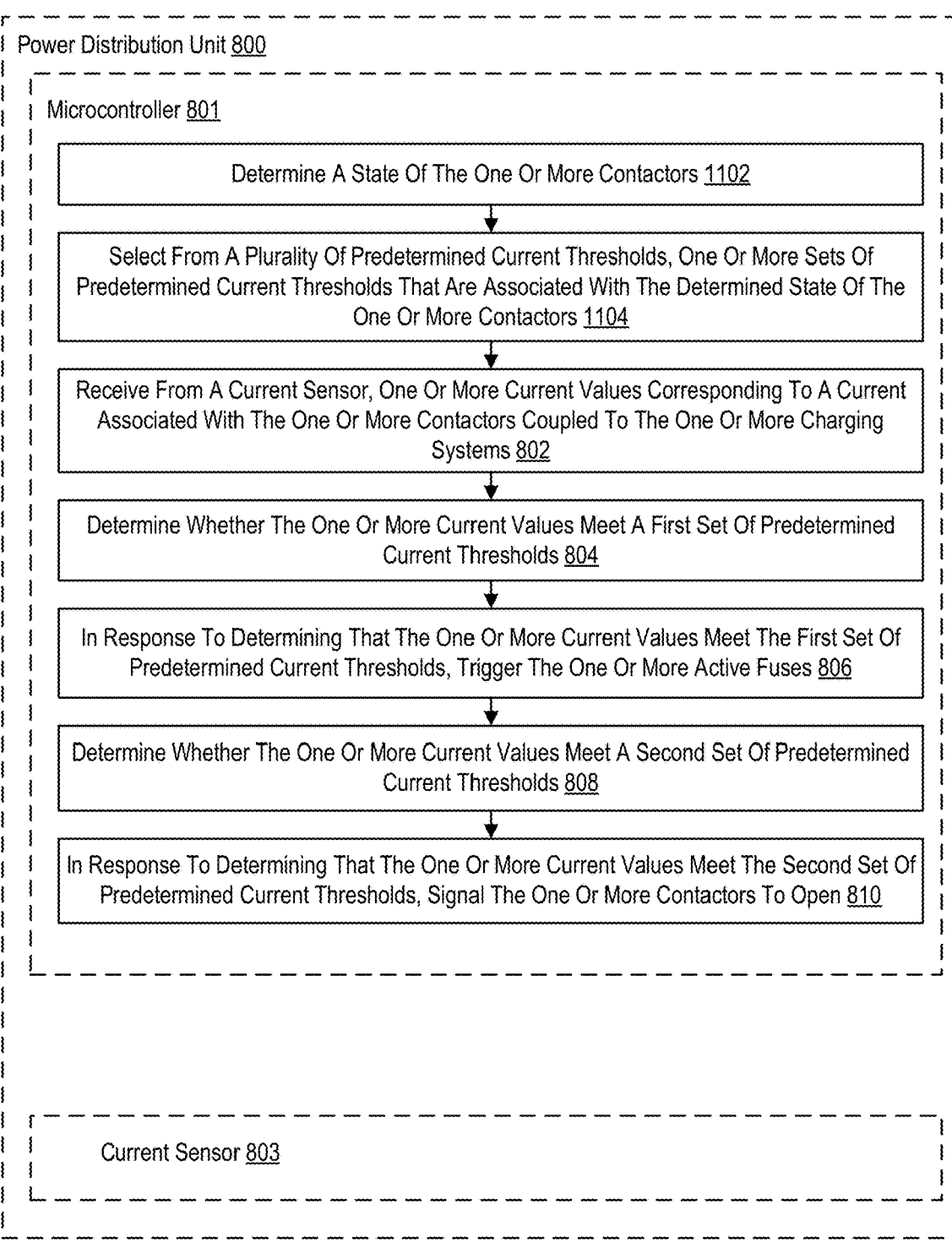
FIG. 11 sets forth a flow chart of an example method of implementing contactor opening and fusing strategies in a power distribution unit in accordance with at least one embodiment of the present disclosure.

For further explanation, FIG. 11 sets forth a flow chart of an example method of implementing contactor opening and fusing strategies in a power distribution unit. The method of FIG. 11 extends the method of FIG. 8 in that the method of FIG. 11 further includes determining 1102, by the microcontroller 801, a state of the one or more contactors. As explained above, the one or more contactors may be in a CCS state, a MCS state, or a no charge state. Determining 1102, by the microcontroller 801, a state of the one or more contactors may be carried out by periodically receiving a signal from the one or more contactors that indicates the current state of the one or more contactors; polling the one or more contactors for a current state; and in response to the polling, receiving from the one or more contactors, an indication of the state of the one or more contactors. In a particular embodiment, if the one or more contactors change state, the signal from the one or more contactors to the microcontroller may change to indicate the new state of the one or more contactors.

In addition, the method of FIG. 11 includes the microcontroller 801 selecting 1104, from a plurality of predetermined current thresholds, one or more sets of predetermined current thresholds that are associated with the determined state of the one or more contactors. In a particular embodiment, one or more sets of predetermined current thresholds includes one or more thresholds that are specific to a state of the one or more contactors. Each state may have different current thresholds for the microcontroller to trigger the one or more active fuses. Selecting 1104, from a plurality of predetermined current thresholds, one or more sets of predetermined current thresholds that are associated with the determined state of the one or more contactors may be carried out by identifying the predetermined set of current thresholds that correspond to the determined state of the one or more contactors.

Figure 12:
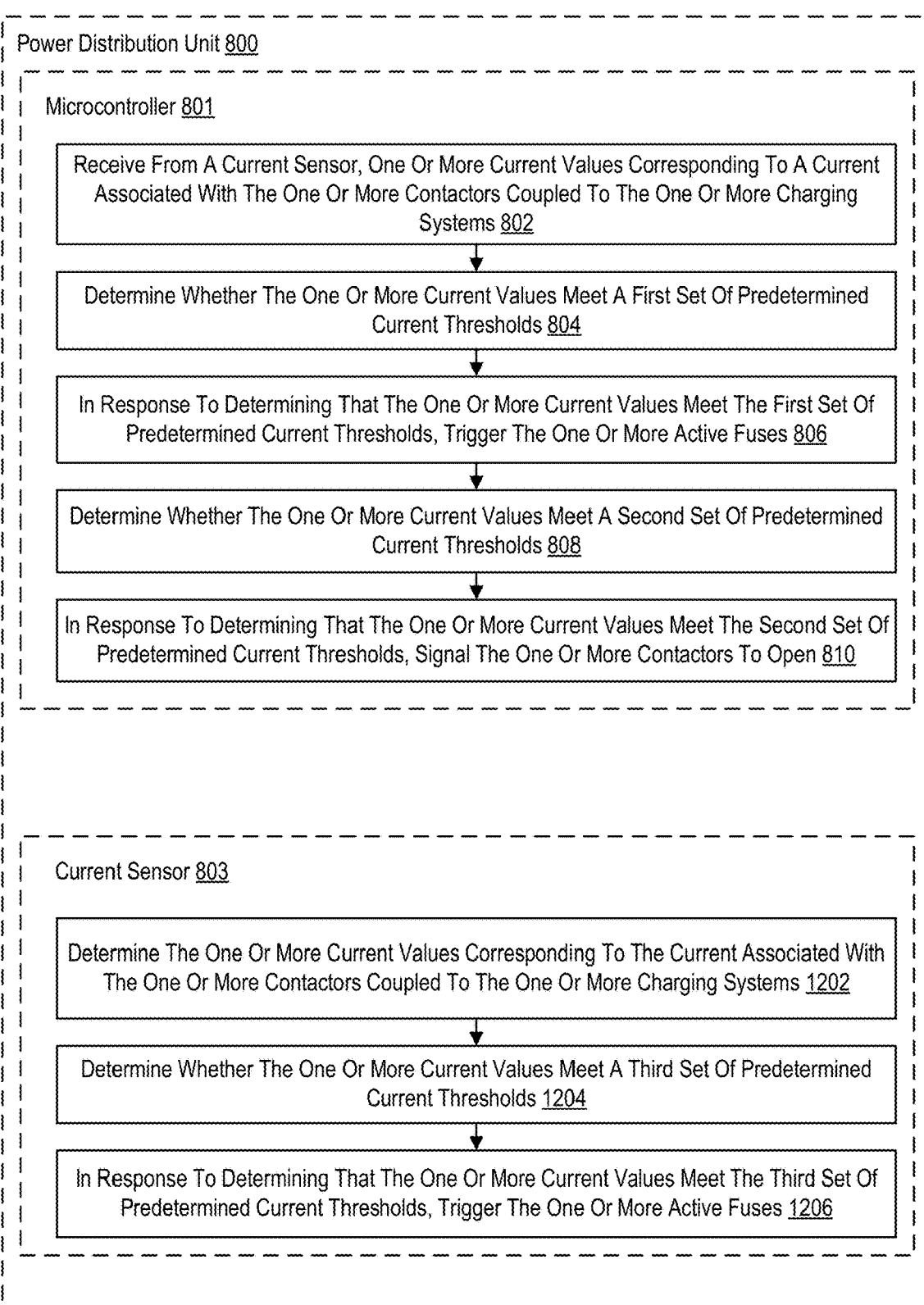
FIG. 12 sets forth a flow chart of an example method of implementing contactor opening and fusing strategies in a power distribution unit in accordance with at least one embodiment of the present disclosure.

For further explanation, FIG. 12 sets forth a flow chart of an example method of implementing contactor opening and fusing strategies in a power distribution unit. The method of FIG. 12 extends the method of FIG. 8 in that the method of FIG. 12 further includes a current sensor 803 determining 1202 the one or more current values corresponding to the current associated with the one or more contactors coupled to the one or more charging systems. Determining 1202 the one or more current values corresponding to the current associated with the one or more contactors coupled to the one or more charging system may be carried out by measuring the voltage signal along a wire that carries the current; and amplifying the signal.

The method of FIG. 12 also includes the current sensor 803 determining 1204 whether the one or more current values meet a third set of predetermined current thresholds. A set of predetermined current thresholds may be one or more current thresholds that determine current limits for a particular type of disconnection of the current, given the state of the one or more contactors. In the method of FIG. 12, the third set of predetermined current thresholds correspond to the current thresholds for the current sensor to trigger the one or more active fuses.

In addition, the method of FIG. 12 also includes in response to determining that the one or more current values meet the third set of predetermined current thresholds, triggering 1206, by the current sensor 803, the one or more active fuses. As explained above, when current increases, faster triggering of the one or more active fuses is required. For example, at 2000 A the microcontroller should trigger the one or more active fuses within 0.25 seconds in order to stay below 1 $MA^2s$. As the microcontroller is not that fast, triggering of the one or more active fuses is taken over by an alarm pin of the current sensor. In this example, the third set of predetermined current thresholds may include a first threshold of above 2000 A and a second threshold of below −2000 A. In this example, if the current sensor determines or detects one or more current values that are below −2000 A or above 2000 A, the current sensor may determine that the one or more current values meet the third set of predetermined current thresholds and trigger the one or more active fuses before the microcontroller is able to process the signal from the current sensor. Triggering 1206, by the current sensor 803, the one or more active fuses in response to determining that the one or more current values meet the third set of predetermined current thresholds may be carried out by sending a signal to the one or more active fuses. In response to receiving the signal from the current sensor, the one or more active fuses may activate and sever the connection between the one or more contactors and the battery system.

Figure 13:
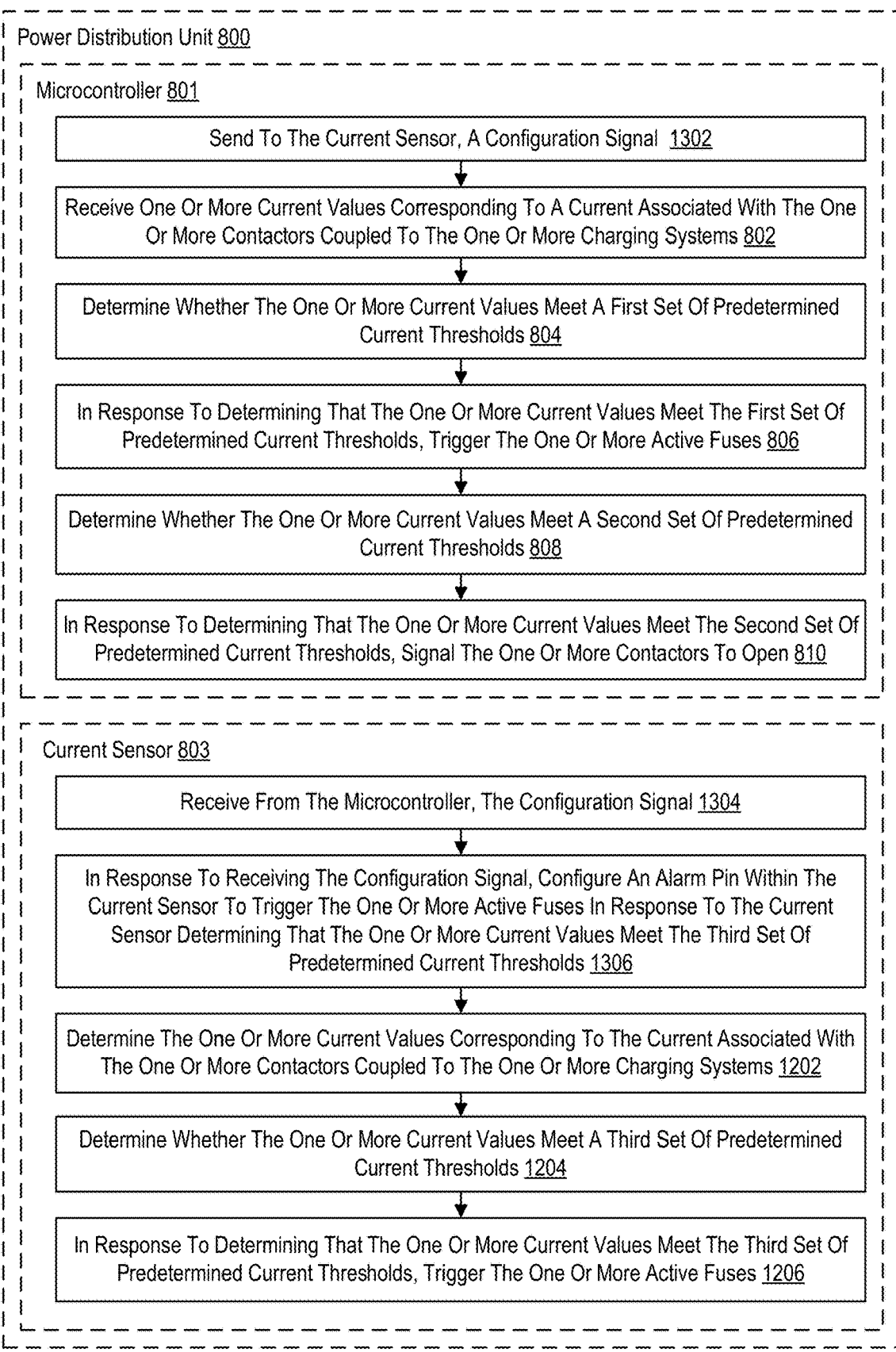
FIG. 13 sets forth a flow chart of an example method of implementing contactor opening and fusing strategies in a power distribution unit in accordance with at least one embodiment of the present disclosure.

For further explanation, FIG. 13 sets forth a flow chart of an example method of implementing contactor opening and fusing strategies in a power distribution unit. The method of FIG. 13 extends the method of FIG. 12 in that the method of FIG. 13 further includes the microcontroller 801 sending 1302 to the current sensor 803, a configuration signal to configure the current sensor to trigger the one or more active fuses in response to the current sensor determining that the one or more current values meet the third set of predetermined current thresholds. Sending 1302 to the current sensor 803, a configuration signal to configure the current sensor to trigger the one or more active fuses in response to the current sensor determining that the one or more current values meet the third set of predetermined current thresholds may be carried out by transmitting data to the current sensor that indicates one or more new current thresholds associated with one or more states of the one or more contactors.

The method of FIG. 13 also includes the current sensor 803 receiving 1304 from the microcontroller 801, the configuration signal to configure the current sensor to trigger the one or more active fuses in response to the current sensor determining that the one or more current values meet the third set of predetermined current thresholds. Receiving 1304 from the microcontroller 801, the configuration signal to configure the current sensor to trigger the one or more active fuses in response to the current sensor determining that the one or more current values meet the third set of predetermined current thresholds may be carried out by receiving data that indicates one or more new current thresholds associated with one or more states of the one or more contactors.

In addition, the method of FIG. 13 also includes in response to receiving the configuration signal, configuring 1306, by the current sensor 803, an alarm pin within the current sensor 803 to trigger the one or more active fuses in response to the current sensor determining that the one or more current values meet the third set of predetermined current thresholds. Configuring 1306, by the current sensor 803, an alarm pin within the current sensor 803 to trigger the one or more active fuses in response to the current sensor determining that the one or more current values meet the third set of predetermined current thresholds may be carried out by storing a new value for a current threshold for the current sensor to trigger the one or more active fuses.

In view of the foregoing, embodiments in accordance with the present disclosure provides protection all possible overcurrent and short circuit situations for no charging, CCS charging, and MCS charging. By triggering pyrofuses indirectly from the microcontroller (slow response at low current) and directly from the shunt current sensor amplifier (fast response at high current), it can be assured that the current is shut off within the $I^2t$ limit to avoid damaging components.

Advantages and features of the present disclosure can be further described by the following statements:

1. A power distribution unit for implementing contactor opening and fusing strategies, the power distribution unit comprising: one or more contactors coupled to one or more charging systems; one or more active fuses in a circuit connecting the one or more contactors to a battery system; and a microcontroller configured to: receive from a current sensor, one or more current values corresponding to a current associated with the one or more contactors coupled to the one or more charging systems; determine whether the one or more current values meet a first set of predetermined current thresholds; in response to determining that the one or more current values meet the first set of predetermined current thresholds, trigger the one or more active fuses; determine whether the one or more current values meet a second set of predetermined current thresholds; and in response to determining that the one or more current values meet the second set of predetermined current thresholds, signal the one or more contactors to open.

2. The power distribution unit of statement 1, wherein the microcontroller is further configured to compensate the one or more current values based on a temperature measurement.

3. The power distribution unit of statement 1 or 2, wherein the microcontroller is further configured to: receive input from a user device; and configure, based on the input, one or more predetermined current thresholds of a plurality of predetermined current thresholds for opening the one or more contactors and triggering the one or more active fuses.

4. The power distribution unit of any of statements 1-3, wherein the microcontroller is further configured to: determine a state of the one or more contactors; and select from a plurality of predetermined current thresholds, one or more sets of predetermined current thresholds that are associated with the determined state of the one or more contactors.

5. The power distribution unit of any of statements 1-4, wherein the determined state of the one or more contactors is one of: no charging; combined charging system (CCS) charging; and megawatt charging system (MCS) charging.

6. The power distribution unit of any of statements 1-5 further comprising: the current sensor, the current sensor configured to: determine the one or more current values corresponding to the current associated with the one or more contactors coupled to the one or more charging systems; determine whether the one or more current values meet a third set of predetermined current thresholds; and in response to determining that the one or more current values meet the third set of predetermined current thresholds, trigger the one or more active fuses.

7. The power distribution unit of any of statements 1-6, wherein the microcontroller is further configured to: send to the current sensor, a configuration signal to configure the current sensor to trigger the one or more active fuses in response to the current sensor determining that the one or more current values meet the third set of predetermined current thresholds.

8. The power distribution unit of any of statements 1-7, wherein the current sensor is further configured to: receive from the microcontroller, the configuration signal to configure the current sensor to trigger the one or more active fuses in response to the current sensor determining that the one or more current values meet the third set of predetermined current thresholds; and in response to receiving the configuration signal, configure an alarm pin within the current sensor to trigger the one or more active fuses in response to the current sensor determining that the one or more current values meet the third set of predetermined current thresholds.

9. A method for implementing contactor opening and fusing strategies in a power distribution unit, the method comprising: receiving from a current sensor of a power distribution unit, by a microcontroller of the power distribution unit, one or more current values corresponding to a current associated with one or more contactors coupled to one or more charging systems; determining, by the microcontroller, whether the one or more current values meet a first set of predetermined current thresholds; in response to determining that the one or more current values meet the first set of predetermined current thresholds, triggering, by the microcontroller, one or more active fuses in a circuit connecting the one or more contactors to a battery system; determining, by the microcontroller, whether the one or more current values meet a second set of predetermined current thresholds; and in response to determining that the one or more current values meet the second set of predetermined current thresholds, signaling, by the microcontroller, the one or more contactors to open.

10. The method of statement 9 further comprising: receiving, by the microcontroller, input from a user device; and configuring, based on the input, by the microcontroller, one or more predetermined current thresholds of a plurality of predetermined current thresholds for opening the one or more contactors and triggering the one or more active fuses.

11. The method of statement 9 or 10 further comprising: determining, by the microcontroller, a state of the one or more contactors; and select from a plurality of predetermined current thresholds, by the microcontroller, one or more sets of predetermined current thresholds that are associated with the determined state of the one or more contactors.

12. The method of any of statements 9-11, wherein the determined state of the one or more contactors is one of: no charging; combined charging system (CCS) charging; and megawatt charging system (MCS) charging.

13. The method of any of statements 9-12 further comprising: determining, by the current sensor, the one or more current values corresponding to the current associated with the one or more contactors coupled to the one or more charging systems; determining, by the current sensor, whether the one or more current values meet a third set of predetermined current thresholds; and in response to determining that the one or more current values meet the third set of predetermined current thresholds, triggering, by the current sensor, the one or more active fuses.

14. The method of any of statements 9-13 further comprising: sending to the current sensor, by the microcontroller, a configuration signal to configure the current sensor to trigger the one or more active fuses in response to the current sensor determining that the one or more current values meet the third set of predetermined current thresholds.

15. The method of any of statements 9-14 further comprising: receiving from the microcontroller, by the current sensor, the configuration signal to configure the current sensor to trigger the one or more active fuses in response to the current sensor determining that the one or more current values meet the third set of predetermined current thresholds; and in response to receiving the configuration signal, configuring, by the current sensor, an alarm pin within the current sensor to trigger the one or more active fuses in response to the current sensor determining that the one or more current values meet the third set of predetermined current thresholds.

16. A non-transitory computer readable storage medium for implementing contactor opening and fusing strategies in a power distribution unit, the non-transitory computer readable storage medium storing instructions which, when executed, cause a microcontroller of a power distribution unit to: receive from a current sensor of the power distribution unit, one or more current values corresponding to a current associated with one or more contactors coupled to one or more charging systems; determine whether the one or more current values meet a first set of predetermined current thresholds; in response to determining that the one or more current values meet the first set of predetermined current thresholds, trigger one or more active fuses in a circuit connecting the one or more contactors to a battery system; determine whether the one or more current values meet a second set of predetermined current thresholds; and in response to determining that the one or more current values meet the second set of predetermined current thresholds, signal the one or more contactors to open.

17. The non-transitory computer readable storage medium of statement 16, wherein the storage medium stores instructions which, when executed, cause the microcontroller of the power distribution unit to: receive input from a user device; and configure, based on the input, one or more predetermined current thresholds of a plurality of predetermined current thresholds for opening the one or more contactors and triggering the one or more active fuses.

18. The non-transitory computer readable storage medium of statement 16 or 17, wherein the storage medium stores instructions which, when executed, cause the microcontroller of the power distribution unit to: determine a state of the one or more contactors; and select from a plurality of predetermined current thresholds, one or more sets of predetermined current thresholds that are associated with the determined state of the one or more contactors.

19. The non-transitory computer readable storage medium of any of statements 16-18, wherein the determined state of the one or more contactors is one of: no charging; combined charging system (CCS) charging; and megawatt charging system (MCS) charging.

20. The non-transitory computer readable storage medium of any of statements 16-19, wherein the storage medium stores instructions which, when executed, cause the microcontroller of the power distribution unit to: send to the current sensor, a configuration signal to configure the current sensor to trigger the one or more active fuses in response to the current sensor determining that the one or more current values meet the third set of predetermined current thresholds.

The flowchart and block diagrams in the figures illustrate the architecture, functionality, and operation of possible implementations of systems, apparatuses, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present disclosure without departing from its true spirit. The descriptions in this specification are for purposes of illustration only and are not to be construed in a limiting sense. The scope of the present disclosure is limited only by the language of the following claims.

What is claimed is:

1. A power distribution unit for implementing contactor opening and fusing strategies, the power distribution unit comprising:
   one or more contactors coupled to one or more charging systems;
   one or more active fuses in a circuit connecting the one or more contactors to a battery system; and
   a microcontroller configured to:
      receive from a current sensor, one or more current values corresponding to a current associated with the one or more contactors coupled to the one or more charging systems;
      determine whether the one or more current values meet a first set of predetermined current thresholds;
      in response to determining that the one or more current values meet the first set of predetermined current thresholds, sever a connection between the one or more contactors and the battery system by triggering the one or more active fuses;
      determine whether the one or more current values meet a second set of predetermined current thresholds; and
      in response to determining that the one or more current values meet the second set of predetermined current thresholds, sever a connection between the charging system and the battery by signaling the one or more contactors to open.

2. The power distribution unit of claim 1, wherein the microcontroller is further configured to compensate the one or more current values based on a temperature measurement.

3. The power distribution unit of claim 1, wherein the microcontroller is further configured to:
   receive input from a user device; and
   configure, based on the input, one or more predetermined current thresholds of a plurality of predetermined current thresholds for opening the one or more contactors and triggering the one or more active fuses.

4. The power distribution unit of claim 1, wherein the microcontroller is further configured to:
   determine a state of the one or more contactors; and
   select from a plurality of predetermined current thresholds, one or more sets of predetermined current thresholds that are associated with the determined state of the one or more contactors.

5. The power distribution unit of claim 4 wherein the determined state of the one or more contactors is one of: no charging; combined charging system (CCS) charging; and megawatt charging system (MCS) charging.

6. The power distribution unit of claim 1 further comprising:
the current sensor, the current sensor configured to:
determine the one or more current values corresponding to the current associated with the one or more contactors coupled to the one or more charging systems;
determine whether the one or more current values meet a third set of predetermined current thresholds; and
in response to determining that the one or more current values meet the third set of predetermined current thresholds, trigger the one or more active fuses.

7. The power distribution unit of claim 6, wherein the microcontroller is further configured to:
send to the current sensor, a configuration signal to configure the current sensor to trigger the one or more active fuses in response to the current sensor determining that the one or more current values meet the third set of predetermined current thresholds.

8. The power distribution unit of claim 7 wherein the current sensor is further configured to:
receive from the microcontroller, the configuration signal to configure the current sensor to trigger the one or more active fuses in response to the current sensor determining that the one or more current values meet the third set of predetermined current thresholds; and
in response to receiving the configuration signal, configure an alarm pin within the current sensor to trigger the one or more active fuses in response to the current sensor determining that the one or more current values meet the third set of predetermined current thresholds.

9. A method for implementing contactor opening and fusing strategies in a power distribution unit, the method comprising:
receiving from a current sensor of a power distribution unit, by a microcontroller of the power distribution unit, one or more current values corresponding to a current associated with one or more contactors coupled to one or more charging systems;
determining, by the microcontroller, whether the one or more current values meet a first set of predetermined current thresholds;
in response to determining that the one or more current values meet the first set of predetermined current thresholds, sever a connection between the one or more contactors and a battery system by triggering, by the microcontroller, one or more active fuses in a circuit connecting the one or more contactors to the battery system;
determining, by the microcontroller, whether the one or more current values meet a second set of predetermined current thresholds; and
in response to determining that the one or more current values meet the second set of predetermined current thresholds, sever a connection between the charging system and the battery by signaling, by the microcontroller, the one or more contactors to open.

10. The method of claim 9 further comprising:
receiving, by the microcontroller, input from a user device; and
configuring, based on the input, by the microcontroller, one or more predetermined current thresholds of a plurality of predetermined current thresholds for opening the one or more contactors and triggering the one or more active fuses.

11. The method of claim 9 further comprising:
determining, by the microcontroller, a state of the one or more contactors; and
select from a plurality of predetermined current thresholds, by the microcontroller, one or more sets of predetermined current thresholds that are associated with the determined state of the one or more contactors.

12. The method of claim 11 wherein the determined state of the one or more contactors is one of: no charging; combined charging system (CCS) charging; and megawatt charging system (MCS) charging.

13. The method of claim 12 further comprising:
determining, by the current sensor, the one or more current values corresponding to the current associated with the one or more contactors coupled to the one or more charging systems;
determining, by the current sensor, whether the one or more current values meet a third set of predetermined current thresholds; and
in response to determining that the one or more current values meet the third set of predetermined current thresholds, triggering, by the current sensor, the one or more active fuses.

14. The method of claim 13 further comprising:
sending to the current sensor, by the microcontroller, a configuration signal to configure the current sensor to trigger the one or more active fuses in response to the current sensor determining that the one or more current values meet the third set of predetermined current thresholds.

15. The method of claim 14 further comprising:
receiving from the microcontroller, by the current sensor, the configuration signal to configure the current sensor to trigger the one or more active fuses in response to the current sensor determining that the one or more current values meet the third set of predetermined current thresholds; and
in response to receiving the configuration signal, configuring, by the current sensor, an alarm pin within the current sensor to trigger the one or more active fuses in response to the current sensor determining that the one or more current values meet the third set of predetermined current thresholds.

16. A non-transitory computer readable storage medium for implementing contactor opening and fusing strategies in a power distribution unit, the non-transitory computer readable storage medium storing instructions which, when executed, cause a microcontroller of the power distribution unit to:
receive from a current sensor of the power distribution unit, one or more current values corresponding to a current associated with one or more contactors coupled to one or more charging systems;
determine whether the one or more current values meet a first set of predetermined current thresholds;
in response to determining that the one or more current values meet the first set of predetermined current thresholds, sever a connection between the one or more contactors and a battery system by triggering one or more active fuses in a circuit connecting the one or more contactors to the battery system;

determine whether the one or more current values meet a second set of predetermined current thresholds; and in response to determining that the one or more current values meet the second set of predetermined current thresholds, sever a connection between the charging system and the battery by signaling the one or more contactors to open.

17. The non-transitory computer readable storage medium of claim 16, wherein the non-transitory computer readable storage medium stores instructions which, when executed, cause the microcontroller of the power distribution unit to:
receive input from a user device; and
configure, based on the input, one or more predetermined current thresholds of a plurality of predetermined current thresholds for opening the one or more contactors and triggering the one or more active fuses.

18. The non-transitory computer readable storage medium of claim 16, wherein the non-transitory computer readable storage medium stores instructions which, when executed, cause the microcontroller of the power distribution unit to:
determine a state of the one or more contactors; and
select from a plurality of predetermined current thresholds, one or more sets of predetermined current thresholds that are associated with the determined state of the one or more contactors.

19. The non-transitory computer readable storage medium of claim 18, wherein the determined state of the one or more contactors is one of: no charging; combined charging system (CCS) charging; and megawatt charging system (MCS) charging.

20. The non-transitory computer readable storage medium of claim 16, wherein the non-transitory computer readable storage medium stores instructions which, when executed, cause the microcontroller of the power distribution unit to:
send to the current sensor, a configuration signal to configure the current sensor to trigger the one or more active fuses in response to the current sensor determining that the one or more current values meet the third set of predetermined current thresholds.

* * * * *